May 16, 1950        J. ALTMAYER        2,507,686
ARBOR
Filed Aug. 8, 1947
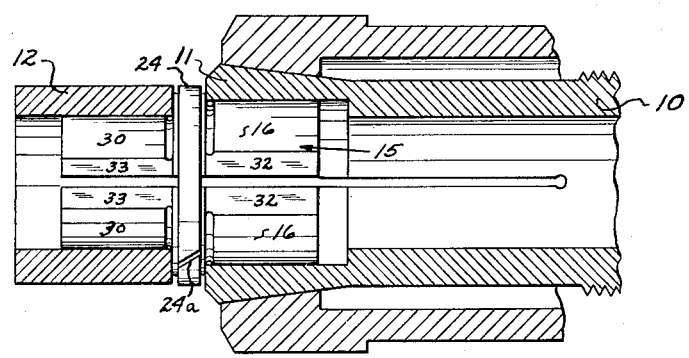
FIG. 1
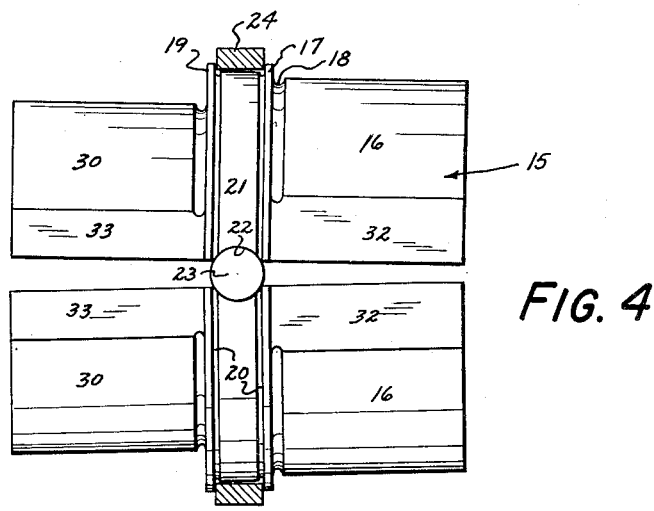
FIG. 4
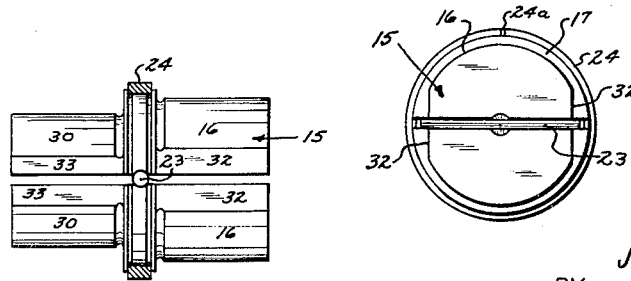
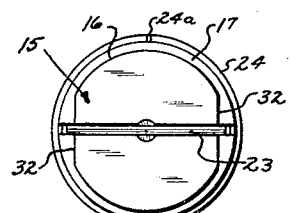
FIG. 3
FIG. 2
INVENTOR.
JOHN ALTMAYER
BY
*J. D. Douglass*
ATTORNEY Patented May 16, 1950

2,507,686

UNITED STATES PATENT OFFICE 2,507,686

ARBOR

John Altmayer, Cleveland, Ohio

Application August 8, 1947, Serial No. 767,377

18 Claims. (Cl. 279—2)

This invention relates to machine tools and to an arbor, or mandrel, for use with a machine tool and the method of making the same. More particularly, the invention will be described in connection with an expanding arbor adapted to be gripped by a collet in a machine and the arbor in turn to expand and grip a work piece.

As is well known to those versed in the art, it has been common practice to provide arbors for use in conjunction with lathes, screw machines, drill presses and milling machines, as well as other machines, for holding a piece commonly known as a work piece upon which a machining operation is to be performed. These arbors usually hold the work by gripping it on the inside diameter thereof. Heretofore, one of the disadvantages of the prior art resided in the fact that it was a slow and time consuming operation to change work pieces. Usually, it was necessary to stop the machine and use a wrench or screw driver to expand or relax the arbor for gripping or releasing the work piece.

Another disadvantage in the prior art devices resided in the fact that they entailed a somewhat complicated mechanism requiring a great many operations to manufacture the same, resulting in a high cost of manufacture. The mechanism of these arbors was subject to becoming clogged with chips, dust or other foreign material, rendering them ineffective for the purpose intended, if not completely inoperative, and making frequent cleaning a necessary and time consuming operation, during which time they could not be used for production.

A particular problem existed in connection with work pieces where they were gripped or chucked by means engaging in a blind hole. These made it necessary to "tailor make" apparatus for the particular job. This was not only time consuming but was expensive.

By my present invention, I have provided an arbor which is comparatively inexpensive to manufacture, and, to a major extent, eliminates all of the aforementioned problems. An arbor constructed according to my invention enables work pieces to be placed in the machine without stopping the spindle. This materially speeds up production. The construction is such that concentricity of the work done, using my arbor, is limited only by the concentricity of the spindle of the machine itself; the arbor not adding to any error in concentricity existing in the machine. Another advantage resides in the fact that no changes need be made in the machine, as it exists, or the collets of the machine, and no additional tools are needed for operating the arbor.

The construction of my arbor is such that different sizes of work pieces may be gripped in a machine by merely substituting arbors having different size work gripping surfaces, but all having the same size collet engaging surfaces, making it unnecessary to take the time to change the collets.

Another advantage of the arbor of my invention resides in the fact that a positive collet and work piece stop is provided, thus decreasing the time for chucking as well as retaining a greater accuracy of position for the work piece with relation to the cutting tools.

Another advantage resides in the fact that the holding pressure exerted by the collet on the work piece may be controlled between very narrow limits.

Still other advantages of my invention and the invention itself will become more apparent from the following description of some embodiments thereof, which description is illustrated by the accompanying drawings and forms a part of this specification.

In the drawings:

Fig. 1 is an elevational view of an arbor constructed according to my invention and showing in fragmentary sections the manner of cooperation of the arbor with a collet of a machine tool, and showing in section a work piece supported on the arbor;

Fig. 2 is a view of the arbor removed from the collet with the retaining ring being shown in section to illustrate the underlying parts;

Fig. 3 is an end elevational view of the arbor; and

Fig. 4 is an enlarged fragmentary sectional view showing the operation of the arbor.

Referring now to the drawings, throughout which like parts are designated by like reference characters and more particularly to Fig. 1, my invention broadly comprises an arbor formed in two sections or halves which are held apart and in spaced relation by a fulcrum member between the halves at their center and together and in parallel relation by a split ring disposed around the periphery thereof.

As shown in Fig. 1, a collet is illustrated at 10 and is operated by a draw bar not shown to close the jaws 11 in a manner well known in the art.

The arbor is illustrated in elevation in this figure and is shown as supporting a work piece which in this instance is a bushing 12 which is to have a machining operation performed thereon, the bushing may be one having a blind hole and is engaged by the arbor.

The arbor includes two body parts or halves which are substantially identical. A shank 15 is provided for the arbor, being formed with semi-cylindrical surfaces 16, the curvature of which conforms to the diameter of the gripping surface of the collet. For example, this surface may be machined on a diameter of 1¼ inch to fit into a 1¼ inch collet.

The cylindrical surface 16 extends up to a peripheral flange 17, being separated slightly from the flange by a narrow groove 18 which, as can be seen in the figure, allows the flange 17 to abut the end of the collet. Spaced from the flange 17 is a second flange 19. Both flanges are of the same diameter, which is slightly larger than the shank 15. As an example, the shank may be turned on a diameter of 1.250 inches and the flange 1⅜ inches. The surface intermediate the flanges is provided with grooves 20 (Fig. 2) adjacent the flanges and the surface 21 between the grooves is machined cylindrically to a diameter, for example, of 1.312 inches.

As can best be seen in Fig. 2, the mid-portion of each section between the halves is provided with a transverse groove 22. In this instance, the groove is semi-circular and formed on a diameter of .1877 inch. The manner of forming the surfaces and the grooves will be more explicitly explained in connection with the method of manufacturing the device.

These grooves 22 are adapted to receive a fulcrum member 23 which, in the form illustrated, is a cylindrical pin 1 inch long and .1877 inch in diameter.

Seated on the surface 21 between the flanges 17—19 and embracing and holding the two halves of the arbor together, is a split spring ring 24. This ring is split diagonally at 24a and provides a sufficient tension to hold the two parts securely together and in place on the fulcrum pin.

The work engaging end of the arbor is substantially the same, except for its size which may vary, as the collet engaging end. It includes the work engaging surfaces 30 which are also semi-cylindrical in form and of a radius to conform to the diameter of the work piece 12 to be engaged.

The periphery of the shank 15 is milled off on opposite sides at 32 adjacent the meeting edges of the two halves to provide for removal of the material along a chord considering the two halves as forming a complete cylinder. The amount of material removed may vary, but I have found that with a shank having an overall diameter of 1¼ inches a removal of material along this chord to a diameter of 1.180 inches provides for a subsequent satisfactory operation.

Likewise, the material is removed from the work piece engaging end at 33 in a similar manner.

In operation, an arbor is selected wherein the work engaging end 30 is a proper size for engagement with the work piece. The work piece is then placed on the end 30 being preferably slid on until it engages with the flange 19. Obviously, with a work piece having a shallow hole in it, the end of the arbor could bottom in the hole. The arbor with the work piece attached may then be inserted into the collet; the shank 15 being inserted into the collet until the end of the collet engages the flange 17. The draw bar may then be actuated causing the collet jaws to grip the shank of the arbor.

When the shank of the arbor is thus gripped, the halves pivot about the fulcrum pin 23, and the ends forming the work gripping end 30 are expanded by moving away from each other. The work is thus firmly gripped.

It will be noted that this operation does not necessitate stopping the spindle of the machine, since the arbor may be inserted while it is running. In practice, this materially speeds up production, since a plurality of arbors may be used and the work pieces assembled and disassembled from the arbors while one is in the machine.

I have mentioned the fact that both ends of the arbor are milled at 32 to provide flats in zones adjacent the parting lines of the two halves. This provides better gripping engagement for the armor with the work piece because the gripping portion is then confined to the circular portion, and the portions adjacent the parting points of the two halves are out of contact with the work piece. This is particularly effective at the collet end, since the forces tending to contract the collet end and expand the work gripping end are mainly at an angle to the parting line. For instance, if these flats were not provided for and the collet should engage the shank halves at the parting line, there would merely be a tendency for the material to be compressed in the direction of the parting line. By this construction, the engagement is away from the parting line, and no attention need be given to the position of the shank in the collet.

The ring 24 has several functions. It holds the two halves together; retains the fulcrum pin in place; holds the parts in longitudinal alignment; holds the opposed faces parallel and, finally, acts as a spring causing the parts to assume their normal parallel position when pressure is released, thus allowing easy removal of the work piece from the arbor.

The manner of cooperation of the ring with the adbor halves is best shown in enlarged Fig. 4. Here it is to be noted the halves are shown in an exaggerated position with the shank ends 15 compressed and the work engaging ends 30 expanded. It will be noted, therefore, that the surface 21, on which the ring 24 is seated, is now no longer cylindrical as a whole, but at a point 90 degrees from the fulcrum pin 23 takes the same degree of slant as the parting face. This causes the inside corner of the ring to be engaged by the now high side of the surface 21, resulting in a lifting or expansion of the ring between the flanges 17—19. When pressure is released from the shank 15, the ring at these points of engagement on the opposite arbor halves, exerts a compressive force causing the halves to rock back to their original position where the ring seats flat on the surface 20 with considerable pressure. The ring thus resists but allows rocking of the halves on the fulcrum pin and returns the halves when released to normal position.

The ring also assists in maintaining alignment of the two halves longitudinally since the lateral edges of the ring are a relatively close fit with the flanges 17 and 19.

As shown in the drawings, the ring is split diagonally at 24a, thus eliminating any possibility of the split in the ring becoming lined up opposite to the parting line of the two halves and the resultant possibility of misalignment of the halves. Normally, the split in the ring is positioned during assembly at a position 90 degrees to the axis of the fulcrum pin.

In a device of this character, it will be apparent that certain details of construction must be observed. Of prime importance is (a) the concentricity of the cylindrical surfaces on the shank 15 and the work engaging end 30, and (b) the maintenance of a proper position for the groove 22 for the fulcrum pin.

Therefore, another feature of my invention comprises a method of making a tool such as that hereinbefore described.

As a first step in the method of making my improved arbor, I take a solid piece of bar stock and machine it to the outside shape of the arbor but approximately .006 to .008 inch larger. Next, I establish centers in the ends. Then while supporting the piece between centers, I finish grind the outside diameter of the shank 15 and the work engaging end. This enables me to maintain maximum accuracy and concentricity of the two end portions. The piece is then removed from the centers, and the fulcrum pin hole drilled and reamed to the desired diameter. The flats 32—33 are next established 90 degrees to the fulcrum pin hole by milling on the opposite sides. Next, I saw the piece in two longitudinally, the saw kerf passing longitudinally through the fulcrum pin hole. Finally, the parts may be heat treated or hardened and provided with a suitable finish such as "Pentrate" to provide the desired finish. It will be noted that the final halving operation does not need to be extremely accurate, that is, the saw kerf need not pass through the diametric center of the fulcrum pin hole. This is obviously because the walls of the hole which is accurately positioned are not disturbed at the points where the fulcrum pin engages them. The only desiderium being that preferably the kerf be at or near the diameter of the hole so as to provide sufficient seat for the pins. Preferably, the saw kerf should be wide enough to provide the desired clearance between the two parts although, obviously, an additional grinding or milling operation may be performed on these parts to increase the clearance should it be desirable.

I also contemplate a modification of the method of manufacture which somewhat simplifies the manufacturing operation. In this case, I take two pieces of bar stock of rectangular cross section. These may be relatively long. These two pieces then are placed with the wide sides toward each other and a separate thin piece of stock of a thickness of the width of the kerf for the final arbor sandwiched between the two pieces, and all three sweated together to form a substantially solid rectangular laminated bar.

This bar may then be cut to the desired lengths. The pin hole is then drilled in each piece, it being larger in diameter than the thickness of the thin separating piece. The resultant blank is then machined in the same manner as that described. The piece having been outside finished, it is only necessary to separate the parts by unsweating. No sawing is necessary in this case, and the remaining steps are the same as described.

It will be appreciated that I have given dimensions for the purpose of more clearly illustrating the construction, and that arbors may be constructed for use with any size collet or to grip in any size work piece. In some instances, it may be desirable to form the work engaging end with a plurality of cylindrical steps when the piece to be gripped has complementary steps. This enables a larger gripping area to be provided.

In practice I have found that it is desirable to have the work engaging surfaces substantially the same size as the hole in the work to be gripped. I also find that there is a slight tendency, when the shank is compressed by a collet, for the jaws on the work engaging end to bend near the flange 19, tending to keep the surfaces 36 in parallelism and providing a greater uniform gripping area.

It will thus be apparent that I have provided an arbor which lends itself to high production and extremely accurate work. It will also be apparent to those versed in the art, that many modifications and departures may be made from the specific structure shown without departing from the spirit or scope of the invention.

I claim:

1. An arbor comprising a pair of arbor halves, means to hold said halves in spaced tiltable relation to each other comprising a fulcrum member extending between said members.

2. An arbor comprising a pair of arbor halves, means to hold said halves in spaced tiltable relation to each other comprising a fulcrum for holding said halves apart in spaced tiltable relation and a spring surrounding said halves at the fulcrum for holding said halves in position.

3. An arbor comprising a pair of substantially identical halves, means to hold said halves in spaced tiltable relation to each other comprising a fulcrum member extending transversely across said halves in contact therewith at the mid-section of the halves.

4. An arbor comprising a pair of substantially identical halves, means to hold said halves in spaced tiltable relation to each other comprising a fulcrum member, transverse seats formed in said halves for engagement with said fulcrum member.

5. An arbor comprising a pair of substantially identical halves, means to hold said halves in spaced tiltable relation to each other comprising a fulcrum member, transverse seats formed in said halves for engagement with said fulcrum member, spring means surrounding said halves and holding them in contact with said fulcrum member.

6. An arbor formed with spaced concentric ends having semi-cylindrical surfaces for engagement with a collet and a work piece, said arbor being divided longitudinally into like halves, means to hold said halves in spaced tiltable relation to each other including a fulcrum pin, grooves formed in the opposite faces of said halves in the mid-section to provide seats and said pin disposed in said seats.

7. An arbor formed with pairs of concentric semi-cylindrical end surfaces for engagement with a collet and a work piece, said arbor being divided longitudinally on a diameter along its axis to provide oppositely disposed faces, said faces being formed with grooves spaced from the ends of the arbor and a fulcrum member seated in said grooves and holding said parts in spaced tiltable relation to each other, spring means for resiliently holding said parts together and in engagement with said pin.

8. An arbor comprising oppositely disposed end portions provided with concentric semi-cylindrical work piece and collet engaging surfaces, said arbor being divided longitudinally to provide oppositely disposed portions formed with transversely extending grooves in their mid-portion, a fulcrum member disposed in said grooves and holding said portions in spaced tiltable relation to each other, spring means surrounding said portions and having engagement with the peripheries of said portions to hold them resiliently in seating engagement on said fulcrum member.

9. An arbor comprising oppositely disposed end portions provided with concentric semi-cylindrical work piece and collet engaging surfaces, said arbor being divided longitudinally to provide oppositely disposed portions each formed with a transversely extending groove in its mid-portion, a fulcrum member disposed in said grooves and holding said portions in spaced tiltable relation to each other, a flat resilient spring seated on the periphery of said arbor and surrounding the arbor at the fulcrum to hold said parts together and retain said fulcrum member in position.

10. An arbor including end portions formed with concentric cylindrical surfaces for engagement in a collet and work piece, said arbor being divided into two parts longitudinally along its diameter to provide oppositely disposed faces, each of said faces being formed with a transversely extending groove midway between the ends of the faces, a fulcrum member seated in said grooves and holding said parts apart in spaced tiltable relation to each other, a resilient ring member surrounding said arbor parts at said fulcrum and having bearing engagement with said parts in a zone extending on either side of said pin and holding said parts resiliently together and on said pin.

11. An arbor comprising end portions for engagement in a collet and to hold a work piece, said end portions each terminating near the mid portion, a cylindrical seat around said arbor between said end portions, said end portions being formed with cylindrical surfaces, the surfaces on one end being concentric to those on the other end, said arbor being divided longitudinally along a diameter into two similar halves, means to hold said halves in spaced tiltable relation to each other comprising a fulcrum member, said opposite faces being formed to provide transversely extending seats in their mid sections for receiving said fulcrum member, a flat spring ring disposed around said arbor and seated on said cylindrical seat and having lateral engagement with said arbor adjacent said seat.

12. An arbor comprising end portions for engagement in a collet and to hold a work piece, said end portions each terminating near the mid portion in a circular flange of larger diameter than the end portions, a cylindrical seat around said arbor between said end portions and said flanges, said end portions being formed with cylindrical surfaces, the surfaces on one end being concentric to those on the other end, said arbor being divided longitudinally along a diameter into two similar halves, means to hold said halves in spaced tiltable relation to each other comprising a fulcrum member, said opposite faces being formed to provide transversely extending seats in their mid sections for receiving said fulcrum member, a flat spring ring disposed around said arbor and seated on said cylindrical seat and having lateral engagement with said flanges.

13. An arbor comprising end portions for engagement in a collet and to hold a work piece, said end portions each terminating near the mid portion, a cylindrical seat around said arbor between said end portions, said end portions being formed with cylindrical surfaces, the surfaces on one end being concentric to those on the other end, said arbor being divided longitudinally along a diameter into two similar halves, means to hold said halves in spaced tiltable relation to each other comprising a fulcrum member, said opposite faces being formed to provide transversely extending seats in their mid sections for receiving said fulcrum member, a flat spring ring disposed around said arbor and seated on said cylindrical seat and having lateral engagement with said arbor adjacent said seat, said ring also extending opposite the ends of said fulcrum member and holding said halves resiliently in engagement therewith.

14. An arbor formed with spaced concentric ends, one end for engagement with a work piece, and the other end for engagement with a collet, said arbor being divided longitudinally into like halves, means to hold said halves in spaced tiltable relation to each other including a fulcrum pin, and grooves formed in opposite faces of said halves in the mid section to provide seats, said fulcrum pin being disposed in said seats and flat areas on said collet engaging end perpendicular to said fulcrum pin.

15. An arbor formed with spaced concentric ends, one end for engagement with a work piece and the other end for engagement with a collet, said arbor being divided longitudinally on a diameter along its axis into symmetrical halves to provide oppositely disposed faces, said faces being formed with grooves spaced from the end of the arbor, a fulcrum member seated in said grooves and holding said halves in spaced tiltable relation to each other, flat surfaces on opposite sides of said collet engaging end perpendicular to said fulcrum member and spring means for resiliently holding said halves together and in engagement with said fulcrum member.

16. An arbor comprising a plurality of longitudinal jaw members united to form an arbor having a cylindrical work-piece-engaging surface at one end, a cylindrical collet-engaging surface at the other end, and a mid portion between said ends, and fulcrum means disposed interiorly of said jaw members at said mid portion.

17. An arbor comprising a plurality of longitudinal jaw members united to form an arbor having a cylindrical work-piece-engaging surface at one end, a cylindrical collet-engaging surface at the other end, and a mid-portion between said ends, fulcrum means disposed interiorly of said jaw members at said mid portion and spring means disposed about said portion to hold said members together on said fulcrum.

18. An arbor comprising a plurality of longitudinal jaw members united to form an arbor having a cylindrical work-piece engaging surface at one end, a cylindrical collet-engaging surface at the other end and a mid portion between said ends, said mid portion being formed with a seat thereabout, fulcrum means disposed interiorly of said jaw members at said mid portion and a resilient ring member seated in said seat to hold said jaw members together on said fulcrum.

JOHN ALTMAYER.

REFERENCES CITED

The following references are of record in the file of this patent:

UNITED STATES PATENTS

| Number | Name | Date |
|---|---|---|
| 1,402,849 | Eggenweiler | Jan. 10, 1922 |
| 1,411,292 | Mueller | Apr. 4, 1922 |
| 1,601,559 | Clark | Sept. 28, 1926 |
| 1,716,331 | Stowell | June 4, 1929 |
| 1,743,116 | Cook | Jan. 14, 1930 |
| 2,188,833 | Dennison | Jan. 30, 1940 |
| 2,398,278 | Bailey | Apr. 9, 1946 |
| 2,416,220 | Reynolds | Feb. 18, 1947 |
| 2,431,961 | Phillips | Dec. 2, 1947 |
| 2,440,254 | Dodson | Apr. 27, 1948 |
| 2,460,414 | Fuller | Feb. 1, 1949 |